United States Patent
Park

(10) Patent No.: US 12,525,147 B2
(45) Date of Patent: Jan. 13, 2026

(54) SIMULATED BLOOD VESSEL MODEL FOR PUNCTURE OPERATION TECHNIQUE TRAINING AND MANUFACTURING METHOD THEREOF

(71) Applicant: EBM CORPORATION, Tokyo (JP)

(72) Inventor: Young-Kwang Park, Tokyo (JP)

(73) Assignee: EBM CORPORATION, Tokyo (JP)

( * ) Notice: Subject to any disclaimer, the term of this patent is extended or adjusted under 35 U.S.C. 154(b) by 337 days.

(21) Appl. No.: 18/474,010

(22) Filed: Sep. 25, 2023

(65) Prior Publication Data

US 2024/0112602 A1 Apr. 4, 2024

(51) Int. Cl.
*G09B 23/30* (2006.01)

(52) U.S. Cl.
CPC .................... *G09B 23/30* (2013.01)

(58) Field of Classification Search
CPC .............................. G09B 23/30; G09B 23/285
See application file for complete search history.

(56) References Cited

U.S. PATENT DOCUMENTS

| | | | | |
|---|---|---|---|---|
| 5,716,395 A * | 2/1998 | Myers | ............... | A61L 27/507 623/1.5 |
| 6,786,920 B2 * | 9/2004 | Shannon | ............... | A61L 31/10 623/1.13 |
| 9,572,654 B2 * | 2/2017 | Edwin | ............... | A61L 27/507 |
| 2004/0049264 A1 * | 3/2004 | Sowinski | ............... | A61F 2/88 623/1.33 |
| 2012/0282584 A1 * | 11/2012 | Millon | ............... | B29C 39/003 264/28 |
| 2015/0282963 A1 * | 10/2015 | Gounis | ............... | A61B 5/055 623/1.21 |
| 2021/0217542 A1 * | 7/2021 | Chuganey | ............... | H01B 7/0233 |
| 2022/0183943 A1 * | 6/2022 | Joshi | ............... | A61K 8/31 |

FOREIGN PATENT DOCUMENTS

JP   2007-206379 A   8/2007

* cited by examiner

*Primary Examiner* — James S. McClellan
(74) *Attorney, Agent, or Firm* — Taro Yaguchi

(57) ABSTRACT

The present application provides a simulated blood vessel model for puncture operation technique training, capable of reducing the simulated blood leakage, and conferring flexibility to a shape of the model. The simulated blood vessel model comprises: a tube 2 formed of an adhesive material; and a tape 4 wrapped a plurality of times and affixed around the tube 2, wherein a wrapping position of the tape is shifted at a predetermined pitch along a longitudinal direction of the tube 2, and the tape 4 covers an outer circumferential surface of the tube without a gap; wherein the tape 4 is formed of a material allowing two overlapping surfaces of the tape 4 to slide with each other, and configured so that the tube 2 may stretch and/or deform in its axial direction after the tape 4 is wrapped around it.

15 Claims, 5 Drawing Sheets

SIMULATED BLOOD VESSEL MODEL FOR PUNCTURE OPERATION TECHNIQUE TRAINING AND MANUFACTURING METHOD THEREOF

CROSS-REFERENCE TO RELATED APPLICATION

This application claims the benefit of Japanese Patent Application No. 2022-154527, filed on Sep. 28, 2022, which is hereby incorporated by reference.

FIELD OF THE INVENTION

The present invention relates to a simulated blood vessel model for puncture operation technique training and a method for manufacturing the simulated blood vessel model.

BACKGROUND OF THE INVENTION

Puncture operation technique training has been conventionally conducted using a simulated blood vessel.

This training is performed by using a tube material as a simulated blood vessel and embedding the tube material in a simulated human body or the like.

It is assumed that the simulated blood vessel for puncture operation technique training using the tube material is used many times repeatedly, but over time of its use, the tube will be damaged due to the puncture operation, causing a problem that the simulated blood leaks out of the damaged position of the simulated blood vessel after a puncturing surgical instrument such as a syringe or the like is pulled out. When this simulated blood leak occurs, parts including the tube material need to be replaced, making the repair costly.

In order to address this problem of simulated blood leakage, one invention has been disclosed in the following Japanese Unexamined Patent Application Publication No. 2007-206379.

The invention described in the above official gazette is a model for simulated blood vessel for puncture operation technique training, wherein its tube material is comprised of isoprene rubber, and at least part of the outer surface of the tube material is covered with a tube-covering layer composed of a casing material used for sausages.

According to the invention described in the above gazette, by employing a thin isoprene rubber as the tube material as well as thickening the outer layer with the coverage by the covering material, prevention of the simulated blood leak is listed as one of the effects of the invention (Paragraph 0010).

SUMMARY OF THE INVENTION

Incidentally, according to the invention in the gazette, the covering material is a sheet-like casing material, and this casing material is known not to have flexibility in the surface direction. For this reason, the simulated blood vessel model, with this casing material covering the tube material, has no longitudinal elasticity, and therefore, it is difficult to reproduce the natural blood by, for example, making it meander.

An object of the present invention is to provide a simulated blood vessel model for puncture operation technique training, capable of reducing the simulated blood leakage, and conferring flexibility to a shape of the model.

In order to overcome the above challenges, the following invention is provided.

(1) A simulated blood vessel model for puncture technique training, comprising:

a tube formed of a material having adhesiveness, flexibility, and mechanical durability; and a tape wrapped a plurality of times and affixed around the tube, wherein a wrapping position of the tape is shifted at a predetermined pitch along a longitudinal direction of the tube, and the tape covers an outer circumferential surface of the tube without a gap;

wherein the tape is affixed to the tube due to the adhesiveness of the tube surface, but the tape is configured so that it is formed of a material allowing overlapping surfaces of the tape to be non-adherent and slidable with each other, and so that the tube may stretch and/or deform after the tape is wrapped around the tube.

(2) The simulated blood vessel model of (1), wherein the tube is formed of a flexible material and is configured to be stretchable and bendable.

(3) The simulated blood vessel model of (1), wherein the tube is formed of a polyolefin elastomer resin.

(4) The simulated blood vessel model of (1), wherein at both ends of the tube, a pair of connectors are connected for supplying simulated blood to the tube so that each base end part of the connectors is fit in the tube.

(5) The simulated blood vessel model of (4), wherein the tape covers the tube as well as parts including connections of the connectors.

(6) The simulated blood vessel model of (1), wherein a winding pitch of the tape is ¼-½ of a width of the tape.

(7) The simulated blood vessel model of (1), wherein the tape is formed of polytetrafluoroethylene.

(8) The simulated blood vessel model of (1), wherein the tape was wrapped around the tube with an axial line of the tube linearly extended.

(9) The simulated blood vessel model of (8), wherein the simulated blood vessel model comprises a predetermined simulated organ in which the simulated blood vessel model is curved and installed after the tape was wrapped around the tube so as to simulate a meandering blood vessel.

(10) The simulated blood vessel model of (9), wherein in the predetermined simulated organ, a groove is formed in order to install therein the simulated blood vessel model in its curved state.

(11) The simulated blood vessel model of (9), further comprising a simulated skin model covering the simulated blood vessel model and secured to the predetermined simulated organ.

(12) A method for manufacturing a simulated blood vessel model for puncture operation technique training, comprising the steps of:

preparing a tube formed of a material having adhesiveness, flexibility, and mechanical durability;

preparing a tape having a surface slidability; and wrapping the tape a plurality of times and affixing it around the tube while shifting a wrapping position of the tape at a predetermined pitch along a longitudinal direction of the tube, and covering an outer circumferential surface of the tube without a gap, wherein the tape is affixed to the tube due to the adhesiveness of the tube surface, but the tape is configured so that it is formed of a material allowing overlapping surfaces of the tape to be non-adherent and slidable with each other, and so that the tube may stretch and/or deform after the tape is wrapped around the tube.

(13) The method for manufacturing a simulated blood vessel model of (12), further comprising the step of:

before wrapping the tape, at both ends of the tube, connecting a pair of connectors for supplying simulated blood to the tube so that each base end part of the connectors is fit in the tube, wherein, in the step of wrapping the tape, the tape is wrapped so that it wraps the tube as well as parts including connections of the connectors.

(14) The method for manufacturing a simulated blood vessel model of (12), wherein a winding pitch of the tape is ¼-½ of a width of the tape.

(15) The method for manufacturing a simulated blood vessel model of (12), wherein in the step of wrapping the tape, the tape is wrapped around the tube with an axial line of the tube linearly extended.

(16) The method for manufacturing a simulated blood vessel model of (15), further comprising the step of:

curving and installing the simulated blood vessel model in a predetermined simulated organ after the tape was wrapped around the tube so that the simulated blood vessel model simulates a meandering blood vessel.

Note that features of the present invention other than those described above are described in the following embodiments and drawings to enable those skilled in the art to implement the present invention.

DETAILED DESCRIPTION OF THE INVENTION

One embodiment according to the present invention will be described below with reference to accompanying drawings.

(Basic Configuration)

Figure 1:
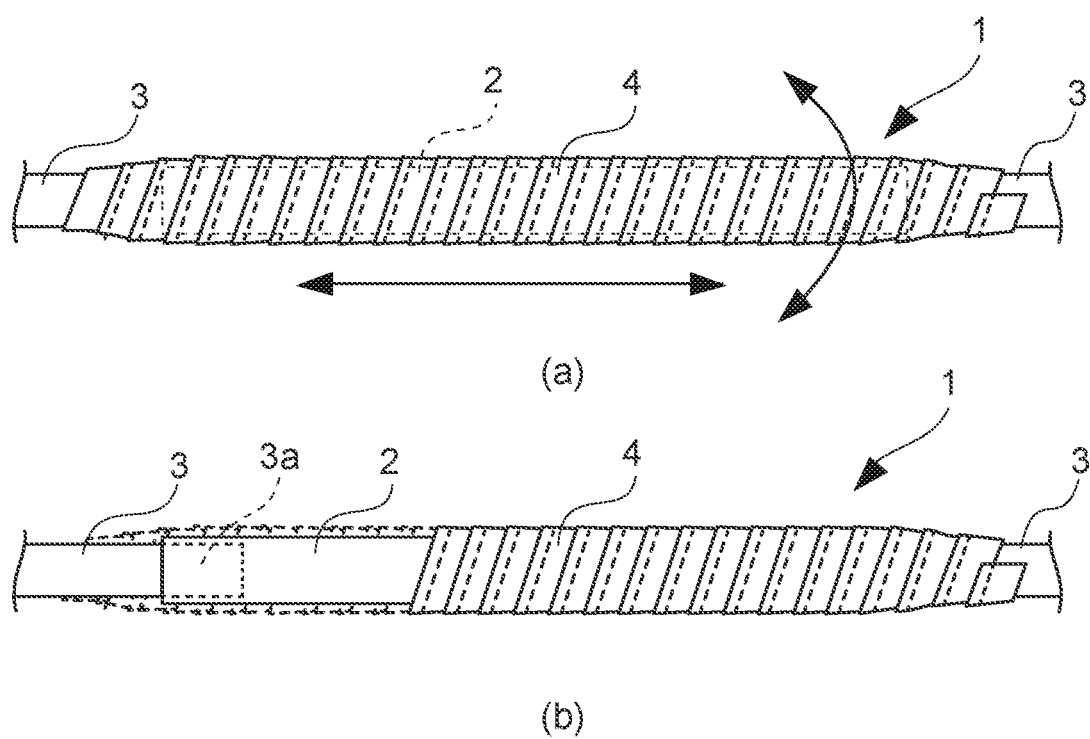
FIG. 1 is a schematic view showing a simulated blood vessel model for puncture operation technique training according to an embodiment of the present invention.

FIGS. 1 (a) and (b) show a simulated blood vessel model 1 for puncture technique training of this embodiment.

The simulated blood vessel model 1 has a tube 2 for simulating a blood vessel, connectors 3 respectively connected to openings at both ends of the tube 2, a tape 4 spirally wrapped and affixed around the tube 2 and the connectors 3. Here, FIG. 1 (a) shows a finished product, which is the tube 2 entirety covered with the tape 4; and FIG. 1 (b) shows, for the purposes of discussion, the finished product with partly omitted tape 4 wrapped around the left side of the tube 2 to thereby expose the connecting part between the tube 2 and the connectors 3.

The tube 2 has adhesiveness and formed of a flexible material deformable into a meandering shape. Also, the tube 2 preferably has mechanical durability and tolerance against inflation-deflation deformation associated with 100 times or more of repeated pressurization and depressurization of internal pressure. Further, more preferably, with a thermoplastic resin, extrusion molding allows high-accuracy mass production, and therefore, cost reduction of the tube 2. As the tube 2, in one embodiment, one formed of a polyolefin elastomer resin is employed.

The connectors 3 are for providing functionality to, for example, connect the tube 2 to a pressurizing fluid feeding system, and in this embodiment, a pair of connectors 3 are secured to the both ends of the tube 2, respectively, with a base end part 3a of each of the connectors 3 fitted in the tube 2. The connectors 3 are formed of a material of low flexibility compared with the tube 2, for example, polypropylene or the like.

The tape 4 covers the full length of the tube 2 by spirally wrapping around the tube 2 at a predetermined pitch while forming a predetermined amount of overlap, wherein although the tape 4 is affixed to the tube 2 due to the adhesiveness of the surface of the tube 2, where two surfaces of the tape 4 overlap, those overlapping surfaces do not adhere to each other, but are slidable with each other.

Accordingly, in this configuration, the flexibility of the tape 4 in addition to the slidability of the overlapping parts of the tape 4 allow the tube 2 to stretch in its axial direction, thus enabling free deformation in its swinging direction. A preferred material for the tape 4 is PTFE (polytetrafluoroethylene).

According to such a configuration, the tape 4 does not constrain the tube 2 from deforming in its long axis direction and swinging direction to thereby allow the reproduction of free blood stream. This is important because actual human arteries and/or veins "meander," and if only straight lines and/or geometrically simple shapes can be reproduced, the users may be able to foresee or predict and the training effect will decrease.

(Manufacturing Method)

Next, a method for manufacturing the simulated blood vessel model will be discussed below with reference to FIG. 2.

In the present embodiment, the tube 2 with an 8.5 mm outer diameter and a 5.5 mm inner diameter, formed by extruding the polyolefin elastomer material is used.

At both ends of the tube 2, the connectors 3 for a medical-grade extension tube (not shown) are connected and secured by fitting the connectors 3 in openings of the both ends of the tube 2.

Figure 2:
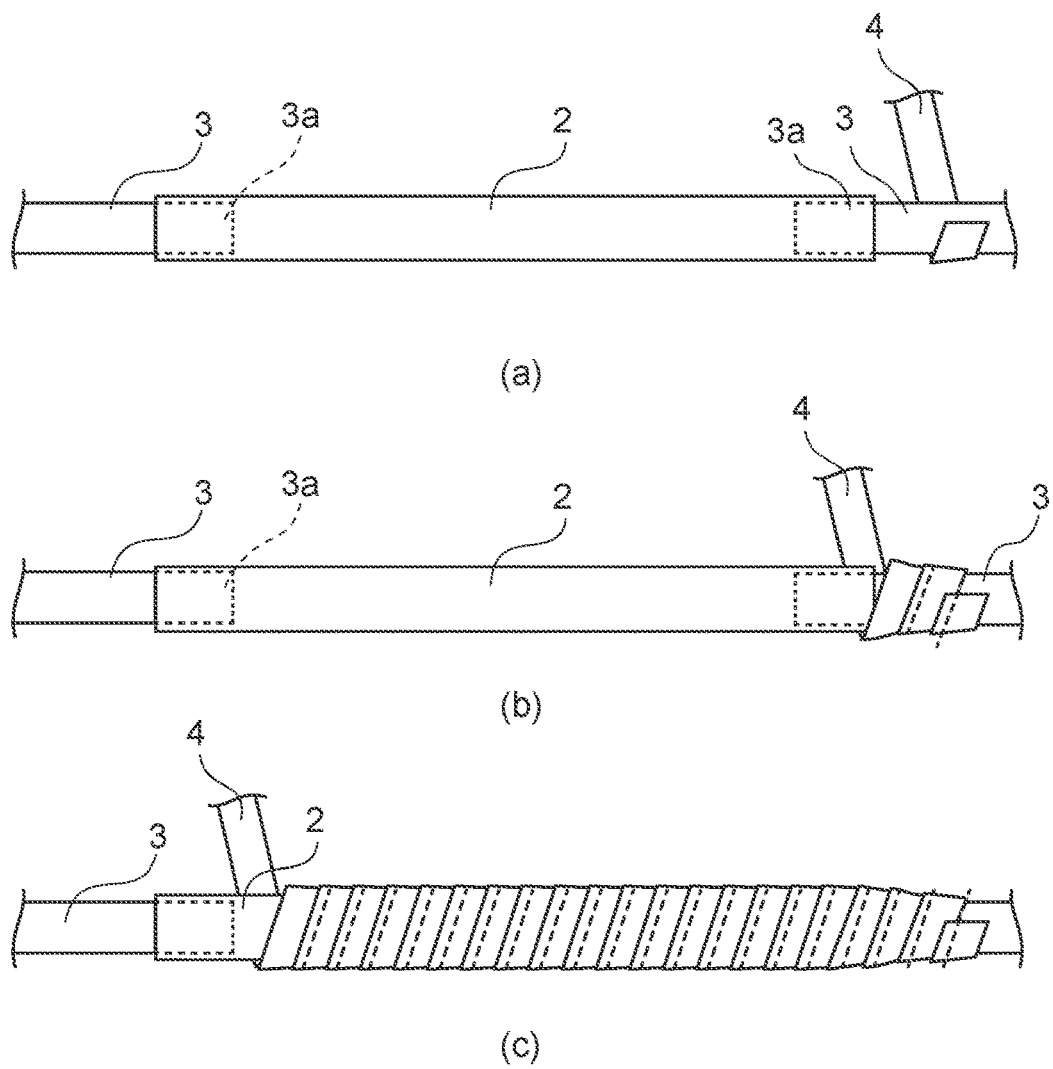
FIG. 2 is a schematic view showing manufacturing steps according to the embodiment of the present invention.

Next, as shown in FIG. 2 (a), while maintaining the tube 2 straight, the tape 4 composed of the PTFE is, in this example, spirally wrapped around the tube 2 starting from the connectors 3 on the left end, as shown in FIGS. 2 (b) and (c), with a pitch of ⅓ of the tape width. In this example, the tape 4 of a 12 mm width is spirally wrapped at a pitch of 4 mm and a pitch angle of 8.8 degree. Affixing of the connectors 3 and the tape 4 at the beginning and the end of wrapping may be done by using an adhesive and/or an adhesive tape.

Whereas, affixing between the tube 2 and the tape 4 is done by tightening the tape 4 in the diametric direction of the tube by a plurality of windings, and using the adhesiveness of the tube 2 itself. Here, since one third of the width of the tape 4 overlaps with the adjacent tape 4, and the overlapping part of the tape does not contact with the tube 2, the remaining two thirds of the tape 4 will be directly affixed to the tube 2. Also, since the overlapping tapes 4 are slidable with each other, the adjacent tapes 4 are not mutually affixed, and relatively displaceable along the long axis direction of the tube 2.

(Performance Verification)

Figure 3:
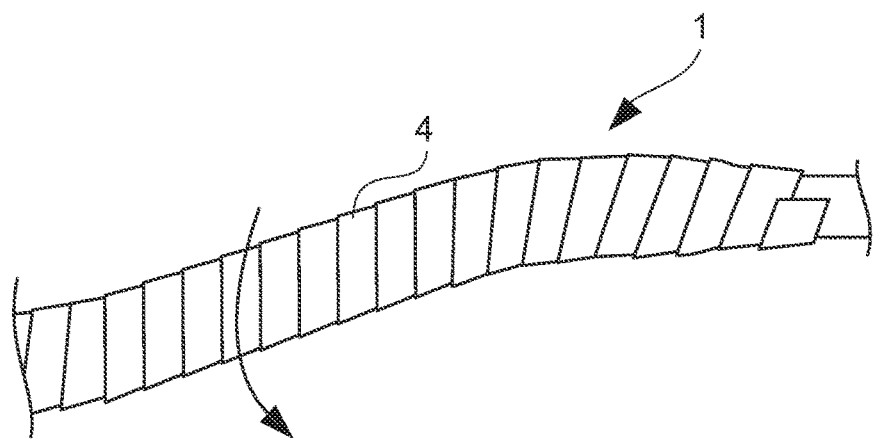
FIG. 3 is a schematic view showing the simulated blood vessel model curved in a meandering state according to the embodiment of the present invention.

When the simulated blood vessel model 1 fabricated as above was tested to verify if it had enough deformability, it was verified that there was enough slidability between the contact surfaces of the tape 4, and that the model did not inhibit the meandering deformation of the tube 2, as shown in FIG. 3.

Next, after the tube 2 was internally pressurized to 200 mmHg by filling it with the tap water through the connectors 3, and then, the tube 2 was punctured with 22G and 17G needles, a backflow was verified, respectively. After removing the needles, there was no leakage verified from the puncture hole. The puncture hole was checked and it was verified that the puncture hole had been closed in a self-repairing manner by the adhesiveness of the polyolefin elastomer resin. This is because the tape 4 was wrapped around the tube 2 a plurality of times to prevent the tube 2 from expanding outwardly in the diametric direction to thereby bias the tube 2 in a direction to close the puncture hole. Additionally, the puncture hole is closed by the tape 4.

(Method of Use)

When the simulated blood vessel model 1 is used for the puncture operation technique training, a syringe is connected to one of the connectors 3 to fill a liquid in the tube 2. When the liquid reaches the other end, a pinchcock of the other connector 3 at the exit side is closed to close the flow channel. Then, the tube is pressurized to an arbitrary pressure. A preferred internal pressure for the training is, for example, 100 mmHg. When the desired pressure is reached, a pinchcock on the entrance side is closed to close the flow channel. Thus, the model internal pressure is maintained by the simulated blood vessel model 1 alone, and at this point, the puncture training may be performed.

Figure 4:
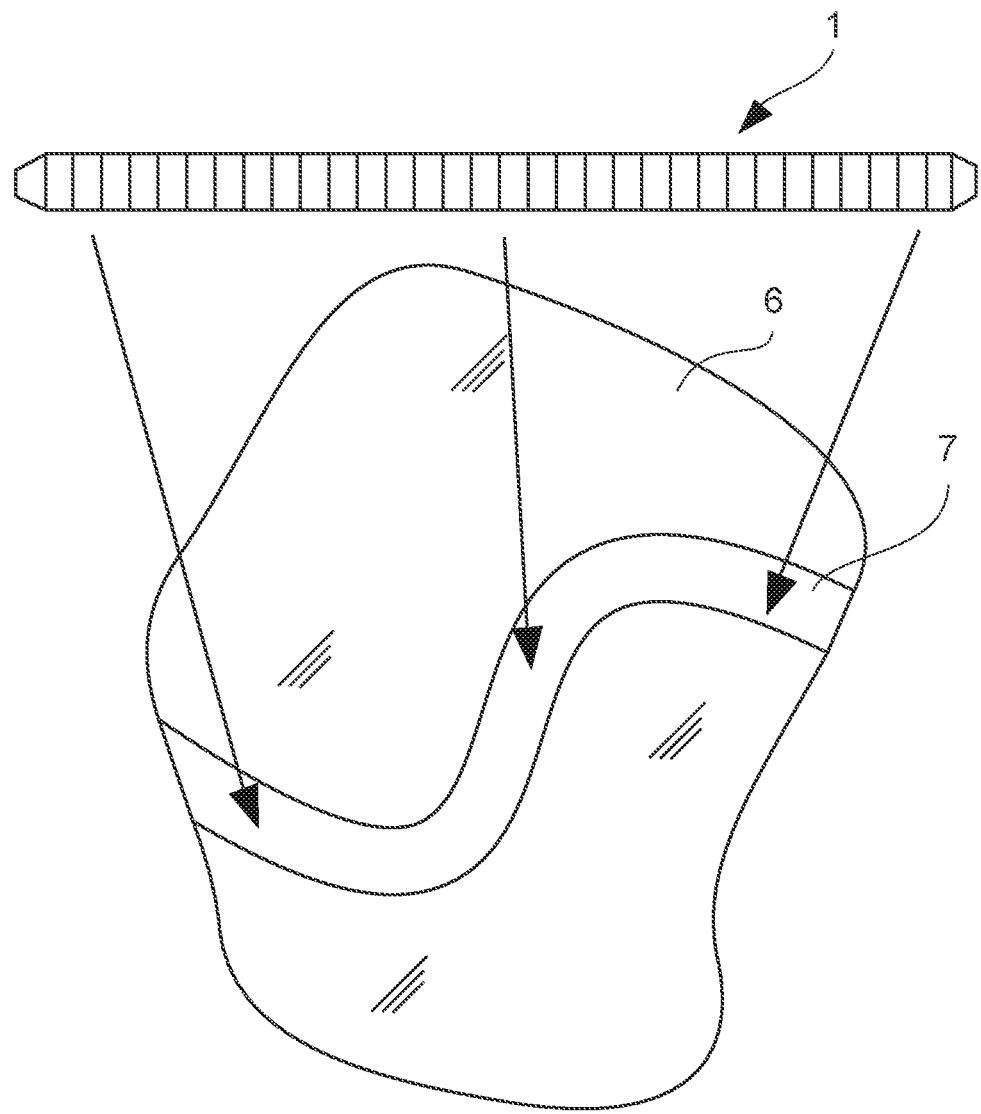
FIG. 4 is a schematic view showing a step of installing the simulated blood vessel model in a simulated organ model according to the embodiment of the present invention.
Figure 5:
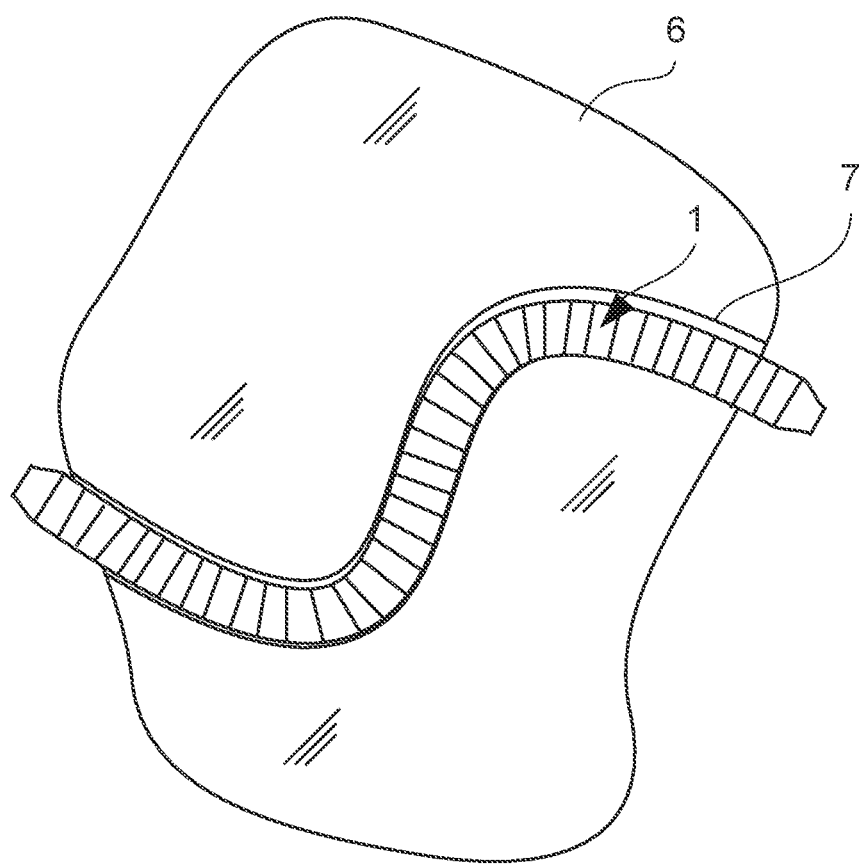
FIG. 5 is a schematic view showing the simulated blood vessel model installed in the simulated organ model according to the embodiment of the present invention.
Figure 6:
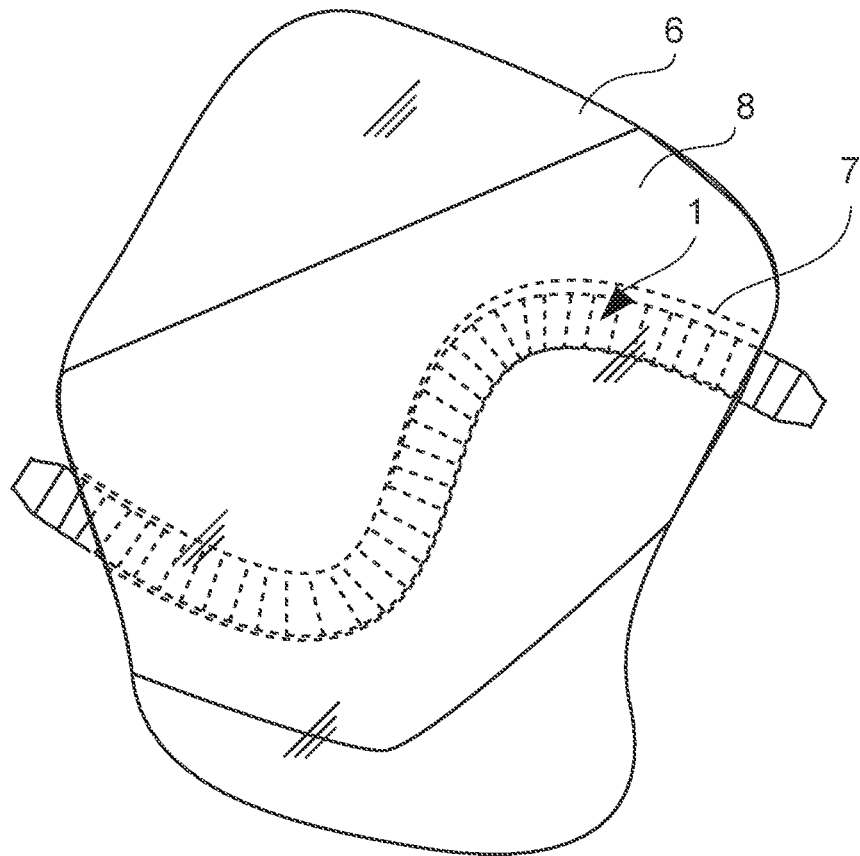
FIG. 6 is a schematic view showing the simulated blood vessel model installed according to the embodiment of the present invention.

When the simulated blood vessel model 1 is used, as shown in FIG. 4-FIG. 6, it may be embedded in a desirable biotissue 6 (simulated organ) for use. In this example, an artery, for instance, is removed from the biotissue 6, and a groove which resulted from the removal where the artery used to be is defined as an install position 7 of the simulated blood vessel (FIG. 4). Then, the simulated blood vessel model 1 is deformed and installed in the install position 7 (groove) so that the model conforms to the shape of the removed artery (FIG. 5).

Here, the biotissue 6 is formed of a cured product of a liquid curable material, and may be a simulated biotissue. In this case, as a material with a texture close to living tissues, for example, soft resins, elastomers, and the like may be used. More specifically, they are, for example, silicone resins and/or various thermoplastic elastomers such as styrene series, ester series, amide series, and urethane series.

Also, after the simulated blood vessel model 1 is embedded as above, as shown in FIG. 6, it may be covered with another simulated skin model (skin sheet or the like) 8.

It should be noted that the present invention is not limited to the above one embodiment, and that various changes and modifications may be made without departing from the spirit and scope of the present invention.

For example, in the above one embodiment, the tube 2 was a polyolefin elastomer resin, but the present invention is not limited thereto, and any flexible tube formed of an adhesive material may be used. Also, the size of the tube 2 is not limited to that of the above one embodiment, and may be configurable as needed according to the size of a simulated blood vessel.

Further, the tape 4 wrapped around the tube 2 is formed of a material allowing two overlapping surfaces of the tape 4 to slide with each other, only needs to be configured so that the tube 2 may stretch and/or deform in its axial direction after the tape 4 is wrapped around it, and is not limited to the material described in the one embodiment.

Moreover, the width of the tape 4 was 12 mm in the one embodiment, but when the blood vessel is curved to more complex shapes, smaller widths than the above, for example, 10 mm, 8 mm, and 6 mm may be used. Also, the overlapping width of the tape 4 in the pitch direction was ⅓ in the one embodiment, but it may be ½ and/or ¼. In sum, it is important that the tape 4 is configured to allow the tube 2 to smoothly curve, stretch, and/or contract so that two surfaces of the tape 4 slide with each other in its overlapping part without causing any distortion when the tube 2 is curved, stretched, and/or contracted.

Further, for the typical blood vessel models, it is important that the tape 4 is wrapped with no gaps in between, but a part of the tube 2 may be not covered and exposed intentionally to thereby form a lump at the part.

Moreover, in the embodiment, the simulated blood vessel model 1 was installed in a biological organ, but the present invention is not limited thereto, and a simulated organ formed of an artificial material may be used. Furthermore, this simulated organ may be, for example, an arch-like (Kamaboko, Japanese Fish Cake-like) soft base.

Also, in the one embodiment, the simulated blood vessel was installed in a meandering manner in and along the groove-like part formed in the simulated organ, but there may be no groove and the simulated blood vessel do not need to meander.

Further, the simulated blood vessel does not need to be secured on the arch-like (Kamaboko, Japanese Fish Cake-like) soft base, but it may be only covered with the simulated skin model 8, and freely placed on the base instead of securing on the base. In this case, the simulated skin model 8 is preferably configured to be capable of adhesion with its own material's adhesiveness, and repeated peeling and adhesion. Thus, passive movement of the blood vessel model may be allowed during the technique training to thereby adequately reproduce the clinical state called "blood vessel escaping" as in the human bodies. Note that, in this case, the base may be a rigid body or a soft material.

What is claimed is:

1. A simulated blood vessel model for puncture technique training, comprising:
   a tube formed of a material having adhesiveness, flexibility, and mechanical durability; and
   a tape formed of polytetrafluorethylene wrapped a plurality of times and affixed around the tube, wherein a wrapping position of the tape is shifted at a predetermined pitch along a longitudinal direction of the tube, and the tape covers an outer circumferential surface of the tube without a gap;
   wherein the tape is affixed to the tube due to the adhesiveness of the tube surface, but the tape is configured so that it is formed of a material allowing overlapping surfaces of the tape to be non-adherent and slidable with each other, and so that the tube may stretch and/or deform after the tape is wrapped around the tube, and the tape is self-sealing when punctured during puncture technique training to reduce leakage of simulated blood.

2. The simulated blood vessel model of claim 1, wherein the tube is formed of a flexible material and is configured to be stretchable and bendable.

3. The simulated blood vessel model of claim 1, wherein the tube is formed of a polyolefin elastomer resin.

4. The simulated blood vessel model of claim 1, wherein at both ends of the tube, a pair of connectors are connected for supplying simulated blood to the tube so that each base end part of the connectors is fit in the tube.

5. The simulated blood vessel model of claim 4, wherein the tape covers the tube as well as parts including connections of the connectors.

6. The simulated blood vessel model of claim 1, wherein a winding pitch of the tape is ¼-½ of a width of the tape.

7. The simulated blood vessel model of claim 1, wherein the tape was wrapped around the tube with an axial line of the tube linearly extended.

8. The simulated blood vessel model of claim 7, wherein the simulated blood vessel model comprises a predetermined simulated organ in which the simulated blood vessel model is curved and installed after the tape was wrapped around the tube so as to simulate a meandering blood vessel.

9. The simulated blood vessel model of claim 8, wherein in the predetermined simulated organ, a groove is formed in order to install therein the simulated blood vessel model in its curved state.

10. The simulated blood vessel model of claim 8, further comprising
a simulated skin model covering the simulated blood vessel model and secured to the predetermined simulated organ.

11. A method for manufacturing a simulated blood vessel model for puncture technique training, comprising the steps of:
preparing a tube formed of a material having adhesiveness, flexibility, and mechanical durability;
preparing a tape formed of polytetrafluorethylene having a surface slidability; and
wrapping the tape a plurality of times and affixing it around the tube while shifting a wrapping position of the tape at a predetermined pitch along a longitudinal direction of the tube, and covering an outer circumferential surface of the tube without a gap,
wherein the tape is affixed to the tube due to the adhesiveness of the tube surface, but the tape is configured so that it is formed of a material allowing overlapping surfaces of the tape to be non-adherent and slidable with each other, and so that the tube may stretch and/or deform after the tape is wrapped around the tube, and the tape is self-sealing when punctured during puncture technique training to reduce leakage of simulated blood.

12. The method for manufacturing a simulated blood vessel model of claim 11, further comprising the step of:
before wrapping the tape, at both ends of the tube, connecting a pair of connectors for supplying simulated blood to the tube so that each base end part of the connectors is fit in the tube,
wherein, in the step of wrapping the tape, the tape is wrapped so that it wraps the tube as well as parts including connections of the connectors.

13. The method for manufacturing a simulated blood vessel model of claim 11, wherein
a winding pitch of the tape is ¼-½ of a width of the tape.

14. The method for manufacturing a simulated blood vessel model of claim 11, wherein
in the step of wrapping the tape, the tape is wrapped around the tube with an axial line of the tube linearly extended.

15. The method for manufacturing a simulated blood vessel model of claim 14, further comprising the step of:
curving and installing the simulated blood vessel model in a predetermined simulated organ after the tape was wrapped around the tube so that the simulated blood vessel model simulates a meandering blood vessel.

\* \* \* \* \*